United States Patent Office 2,838,443
Patented June 10, 1958

2,838,443

CONCENTRATION OF LACTOBACILLI

Hazel B. Gillespie, New Brunswick, N. J., assignor to Rutgers Research and Educational Foundation, New Brunswick, N. J., a non-profit corporation of New Jersey No Drawing. Application July 28, 1955
Serial No. 525,072

11 Claims. (Cl. 195—96)

This invention relates to a process for obtaining or producing, in media from which they can be readily recovered and concentrated, large populations of microorganisms belonging to the species of the family Lactobacteriaceae which are not strictly anaerobic and which produce acid coagulation upon growth in milk, for example, Lactobacillus acidophilus and related forms of bacilli. Some of these micro-organisms are micro-aerophilic, while others are metabolically indifferent with respect to oxygen and are often called facultative anaerobes. Once large populations of these micro-organisms are prepared in accordance with the present invention, they may be recovered and used in ways which have now become well known.

Certain micro-organisms grow most readily in milk media and produce a coagulation of the casein in the milk as a consequence of their growth. With some of these micro-organisms, this growth in milk media is the only economically feasible method for the rapid production of large numbers of micro-organisms. One such microorganism is Lactobacillus acidophilus. Lactobacillus acidophilus, otherwise referred to as L. acidophilus, is a highly beneficial species of the genus Lactobacillus and particularly useful in the human intestinal tract. Concentrates of this bacillus are desired because they permit the ingestion of substantial numbers of L. acidophilus cells in relatively small amounts of suspending fluid. It is also necessary that in such form, the L. acidophilus cells remain viable so that colonization in the intestine may be achieved.

Many strains of L. acidophilus grow best in media that contain milk. Concomitant with the increase of the L. acidophilus count, the casein in the milk is often coagulated, i. e., a curd forms. The curd interferes with the concentration of the L. acidophilus cells. It reduces the efficiency of concentration procedures by occluding an appreciable number of L. acidophilus cells and by adding non-essential bulk to the concentrated material.

One object of this invention is to provide a means and method for the concentration of viable cells of beneficial species or strains of the family Lactobacteriaceae that have been grown in a medium composed principally of milk.

Another object of this invention is to provide a method of growing members of the family Lactobacteriaceae in a medium composed principally of milk with a reduction of the amount of coagulable protein in the medium during the final hours of growth of the culture.

It is a further object of this invention to provide a method that will facilitate the concentrating of viable cells of members of the family Lactobacteriaceae by growing them in milk media which contain, toward the end of the growth period, minimal amounts of coagulable or coagulated protein.

Still another object of this invention is the production of concentrates of L. acidophilus or related bacterial forms suitable for addition to edible materials in sufficient quantities to provide intestinal flora replacement.

Further objects of this invention will become apparent upon consideration of the following description.

In general, this invention provides for the use of sterile, disinfected, pasteurized, or substantially vegetative-bacterial-cell-free suspensions or solutions of proteolytic enzymes, which are added to milk media in which bacterial cells are growing at a time in the growth of the bacterial cultures when the enzyme will prevent the development of an amount of coagulated protein in the milk media that will hinder or interfere with the concentration of the bacterial cells. Only those proteolytic enzymes that function effectively in the pH range established by the culture prior to and during the digestion period can be used.

In the above-mentioned, disinfected, pasteurized, or substantially vegetative-bacterial-cell-free enzyme solution or suspension there must be no vegetative bacterial cells that could grow rapidly under the conditions of the method and destroy or contaminate the product. There may be bacterial spores present, but spores, because of the phenomenon of dormancy, develop too slowly under the conditions of this invention to interfere with the process of this invention.

This invention may be applied generally in the concentration of micro-organisms that coagulate casein as a consequence of their development or growth in milk media. Particularly, this invention is applicable in the concentration of any strains or species of micro-organisms that cannot be grown readily or economically in media other than those composed primarily of milk and that coagulate casein as a result of their growth. Many species or strains of the genus Lactobacillus may be concentrated by this method. This method is of particular value in the concentration of L. acidophilus.

The milk media in which L. acidophilus may be grown by propagation and reproduction may be composed primarily of whole or skimmed milk. These milk media may be fortified with such substances as milk solids, evaporated milk, whey, tomato juice, or bacteriological peptones, to provide additional nutrients. The milk-containing culture media are inoculated with the microorganisms to be concentrated, such as L. acidophilus. The cell reproduction proceeds at a suitable temperature for an appreciable period. In the case of one strain of L. acidophilus, the reproduction proceeds at 37° C. for 9 to 13 hours. During the incubation period, the number of cells increases many fold with the result that the casein in the media approaches or reaches a coagulable condition.

The casein in fresh milk is in colloidal suspension. Acids, including those that bacteria produce, bring about changes in milk that cause the suspended casein to be precipitated in the form of a curd. The proteolytic enzymes, as used in this invention, break down or digest the large casein molecules and in that way produce compounds that are not susceptible to the precipitating effect of the acids produced in the milk media by the bacteria.

In the method of this invention, the sterile, disinfected, or substantially vegetative-bacterial-cell-free suspension or solution of the proteolytic enzyme is added to the culture of growing micro-organisms, such as L. acidophilus, after a period of growth of the microorganisms and before substantial precipitation of the casein has occurred.

It is also a feature of this invention that the growth of the micro-organism culture in the milk medium alters the oxidation-reduction potential of the medium and produces reduced conditions that facilitate the activity of proteolytic enzymes of the papain-ficin group. The enzyme solution or suspension is added to the growing culture before the maximum development of the culture of micro-organisms has been reached. The enzyme must be added in the proper phase in the developmental cycle of the bacterial culture to obtain optimal enzymatic digestion and maximal culture development for a given quantity of culture and milk medium. Further development of the bacterial cells in the culture, and the enzymatic digestion of the casein in the milk medium proceed concurrently.

If the enzyme is not added soon enough, the acidity may become too great for the optimal enzyme activity of at least one group of otherwise usable enzymes. This group includes papain and ficin. In addition to the effect of acidity on the activity of the enzymes involved, increased acidity seems also to affect the digestability of casein. Up to the point of coagulation, increases in acidity seem to render casein more readily digestible, whereas casein curded by acid is apparently less readily digested by enzyme action. This may well be due to the fact that, for physical reasons, the enzyme molecules cannot come into close contact with many of the casein molecules after coagulation has occurred. In fact pepsin, which has an optimal pH range around 2.0 and should act more rapidly as the acidity of the milk culture increases, brings about less active digestion in milk cultures after the acidity has become great enough to cause the casein to coagulate. Even pepsin and pepsin-like enzymes should, therefore, be added to milk cultures before coagulation of the casein has occurred unless a method can be developed which will bring the enzyme molecules into intimate contact with more of the casein molecules in the curded milk. The conditions under which enzyme suspensions are added to milk cultures may also affect the physical nature of the curd that remains undigested, i. e., the ease with which it can be removed from the fluid part of the culture.

The phase of culture growth during which the addition of enzyme is most propitious may vary slightly with different types of enzymes, and is determined by general factors that relate to the growth of the micro-organisms in the milk medium, and to the conditions under which the enzyme in question is most effective. The prerequisites to the addition of the enzyme may be generalized as follows: (a) a bacterial culture that is so well established in the culture medium that the addition of the enzyme will not seriously interfere with the further development of the micro-organisms; (b) a production of acid to provide a favorable pH for the enzyme activity of the particular enzyme; (c) establishment of an oxidation-reduction potential favorable to the enzyme activity; (d) a concentration of acids and antagonistic or antibiotic substances that is great enough to inhibit or prevent the development of contaminating bacteria not destroyed or eliminated when the enzyme is disinfected, pasteurized, or rendered substantially vegetative-bacterial-cell-free.

The period of time that is allowed for the growth of the micro-organism culture before the addition of an enzyme of the papain-ficin group, is determined by the principles outlined above and is dependent upon the rate of growth of the individual bacterial strain. For one strain of L. acidophilus, this period may range up to 14 hours.

Proteolytic action of enzymes of the papain-ficin group takes place in varying degrees in bacterial cultures through a pH range of 6.5 to 4.5. The addition of enzymes of this group to the culture must be made when the culture is well established and when the development of the culture has created conditions that will inhibit or prevent the development of contaminating bacteria. It has been determined that a practical initial pH range for enzymes of the papain-ficin group is from about pH 6 to pH 5. A second group of enzymes may be used in the method of this invention to obtain proteolytic action. This group contains pepsin and pepsin-like enzymes which digest proteins most effectively at a lower pH range, i. e., down to pH 2.0. The combined, but not simultaneously initiated, action of enzymes from the two groups produces very satisfactory casein digestion.

The method of this invention, as applied to any one of the micro-organisms mentioned above, which grows most readily in a milk medium and coagulates casein as a consequence thereof, includes the following steps.

A culture of the micro-organism is transferred to a milk medium by the customary procedure. After a limited period of culture development, conditions in the culture become suitable for the addition of the enzyme. The factors determining this suitability have been outlined above. At the proper stage of culture growth, an appropriate proteolytic enzyme is added. The enzyme digests part of the coagulable protein of the milk and in that way reduces the amount of curd in the finished product. Double digestion procedures, as indicated in certain of the examples set forth below, yield very satisfactory results.

After the micro-organism culture has grown to produce a high bacterial population in the medium, and after the casein has been properly digested, the bacterial cells present in the culture are concentrated by the following commonly used procedures. The fluid part of the culture may be separated from the remaining curd by filtration, low speed centrifugation, or sedimentation. The bacteria are concentrated by high speed centrifugation and washed to remove products of bacterial metabolism as well as any of the added enzyme that may still be present. After the final centrifugation, the concentrated cells are suspended in sterile water, a small amount of $CaCO_3$ is added, and the suspension is brought to a pH of 6.0 to 6.5. The product is dispensed in sterile containers and refrigerated. Micro-organism concentrates prepared in this way will contain billions of viable cells in each milliliter of fluid after the completion of the concentration process, and no significant decrease in the number of viable cells present should occur during at least the first two weeks of refrigeration. To obtain intestinal implantations, such concentrates may be added in appropriate amounts to suitable, edible materials, cold foods or drinks, and consumed, while fresh, by human beings.

The enzyme suspension or solution used in this invention is rendered sterile or substantially vegetative-bacterial-cell-free to avoid contamination of the concentrate, as mentioned above. This sterilization, disinfection, or freeing from substantially all viable bacterial cells is accomplished in the preparation of the various applicable enzymes, in accordance with their natures. Certain enzyme suspensions, which may be referred to as relatively heat-stable, are rendered substantially vegetative-bacterial-cell-free by heating at a temperautre of 63 to 70° C. for a period of at least about 30 minutes. This heating or pasteurization kills most vegetative bacterial cells and renders the enzyme suspension usable for the digestion required in this concentration procedure. The term relatively heat-stable enzyme suspension, as used herein, refers to a suspension of an enzyme like papain, ficin or even pepsin, which contains the enzyme in combination with naturally occurring impurities that increase its stability. In the case of crude or commercial papain, for example, the enzyme and such naturally occurring impurities are found together in the latex that is harvested from the green fruit of the papaya plant or tree. Enzymes that cannot be subjected to heat treatment may be sterilized by filtration through bacterial filters like Berkefeld, Chamberland, Seitz, or sintered glass filters.

Another possible means of rendering the enzymes substantially vegetative-bacterial-cell-free which is applicable to this invention employs chemical compounds that are harmless to human beings or that can be removed from the enzyme mixtures or made harmless to human beings and bacteria by volatilization, dilution, or washing. For example, ethylene oxide gas or ethylene oxide gas combined with carbon dioxide gas may be used to treat the dry enzyme or enzyme suspension and thus produce the desired effect.

This invention is applicable to the concentration of *L. acidophilus* bacteria. One strain of *L. acidophilus*, which has been shown to have beneficial properties, may be recognized by its ability to curdle milk in less than 24 hours. This strain is further identified in Bergey's Manual of Determinative Bacteriology, R. S. Breed, E. G. D. Murray, A. P. Hitchens, sixth edition, 1948, on pages 352–353. The above described method of concentration has been employed in the concentration of this *L. acidophilus* strain, a strain of *Lactobacillus bulgaricus*, and a strain of *Streptococcus lactis*. In the examples of this description that deal with pilot-plant-scale experiments, there are set forth counts of viable cells in the products, which counts vary. The variations in counts result from such factors as (a) the number of organisms present in the original milk cultures and (b) the efficiency of the concentration procedures and equipment.

The following examples are illustrative of the application of the invention to the concentrating of these bacteria and are not limitative of the invention. It will be understood that the percentage amounts of curd in these examples refer to percentage by volume of 100% milk culture.

EXAMPLE I

Ninety-five grams of white Ceylon papain (commercial grade #1) are suspended in one liquid quart of freshly boiled, sterile, tap water and held at 70° C. for 30 minutes to destroy objectionable vegetative bacterial cells. The enzyme suspension is then quickly cooled to 6 to 9° C.

One hundred quarts of skimmed milk are sterilized by a procedure that employs heat, then the skimmed milk, which has been cooled, is inoculated with a vigorously growing culture of *L. acidophilus*. The inoculum is added in a proportion of 2% by volume. The inoculated skimmed milk is maintained at 37° C. for 12 hours. At the end of the 12 hours, the acidity of the milk is approaching the curdling point.

One quart of the prepared papain suspension is mixed with the 100 quarts of milk culture. The mixture takes place before the development of curd in the milk culture. The mixed acidophilus milk culture and enzyme suspension is incubated at 37° C. for 10½ hours. The total incubation period for the acidophilus milk culture is thus 22½ hours. The digested culture is filtered through sterile flannel and the filtrate then run through an ordinary cream separator. The concentrated bacterial cells obtained in the bowl of the separator are washed twice in sterile tap water to remove the products of bacterial metabolism and what remains of the added enzyme. About 300 quarts of sterile tap water are used. After washing, the bacterial cells are reconcentrated. The final bacterial cell concentrate is suspended in about 8 quarts of sterile water, and the pH of the suspension is adjusted to about 6.3.

The fluid concentrate of bacterial cells, obtained by the process of this invention, will contain a variation in counts. The concentration in the concentrate product will vary when produced from the same or similar treated milk cultures. Such variation will result from variations in the procedure of concentration. The following are representative *L. acidophilus* cell concentrations obtained from the method of Example I and are varied by influencing factors, such as the degree of dilution:

I–A—3,000,000,000 cells per milliliter
I–B—5,000,000,000 to 11,000,000,000 cells per milliliter
I–C—2,500,000,000 to 34,000,000,000 cells per milliliter
I–D—2,600,000,000 cells per milliliter
I–E—2,200,000,000 cells per milliliter The range of counts in I–B and I–C reflects dilution of the concentrate.

EXAMPLE II

Ninety-five gram lots of white Ceylon papain are each weighed and suspended in 7 quarts of freshly boiled, sterile, tap water. The suspensions are held at 65° C. for 30 minutes to destroy objectionable vegetative bacterial cells. After the bacterial cell destruction, the enzyme suspensions are cooled to 6 to 9° C.

Two hundred quarts of skimmed milk are sterilized by heating in a vat and then cooled to 37° C. and inoculated with a young culture of *L. acidophilus*. The inoculated milk is allowed to incubate for 12½ hours at 37° C. At the end of 12½ hours, the *L. acidophilus* culture in the milk produces an acidic condition approaching the formation of a curd. Two quarts of the disinfected, substantially vegetative-bacterial-cell-free papain are mixed with 200 quarts of the 12½ hour-old *L. acidophilus* culture. The mixed acidophilus milk culture and enzyme suspension are incubated at 37° C. for 7¼ hours. Thus the total incubation period for the acidophilus milk culture at ths time is 19¾ hours. One hundred and twenty quarts of the clear, digested, whey-like, bacteria-containing supernatant fluid is siphoned from the remainder of the milk culture. The acidity of the remaining 80 quarts of *L. acidophilus* milk culture, containing undigested curd, is reduced to pH 6.8 by the addition of about 85 quarts of dilute alkali.

Five quarts of substantially vegetative-bacterial-cell-free papain suspension are added to the neutralized, partially digested, *L. acidophilus* milk to yield a total concentration, by volume, of about 0.4% papain in the neutralized curd. After 2¾ hours more incubation, 120 quarts of clear supernatant fluid from the digested milk culture are siphoned from the top of the vat. The remaining partially digested curd and whey are drawn from the bottom of the vat.

The relatively clear fluid from the top of the vat is passed through the sterile flannel cloths that are used as filters before an attempt is made to filter the less clear curd-containing fluid from the bottom of the vat. The filtrate thus obtained is run through an ordinary cream separator. The concentrated bacterial cells in the bowl of the separator are washed once in about 100 quarts of sterile tap water and reconcentrated by centrifugation. The final bacterial cell concentrate is suspended in about 8 quarts of sterile water. The pH of the suspension is adjusted to about 6.0 to 6.5, and the suspension is placed in sterile quart bottles. Each sterile quart bottle contains about five grams of $CaCO_3$. The viable *L. acidophilus* cell count of a concentrate that was prepared as indicated above was approximately 3,500,000,000 per milliliter.

The cell count in this case was lower than it should have been. Better counts are obtained when the incubation temperature is more carefully controlled and when digestion periods are a little longer. Also, in this experiment, too much alkali was used when the acidity of the undigested curd was reduced. It is desirable to reduce the acidity to a pH that falls between 6.0 and 6.5 when cells of the strain of *L. acidophilus* used here are involved.

EXAMPLE III

Ninety-five grams of commercial ficin are weighed and suspended in one quart of freshly boiled, sterile, tap water. The suspension is held at 65° C. for 30 minutes to destroy objectionable vegetative bacterial cells. After the bacterial cell destruction, the enzyme suspension is cooled to 6 to 9° C.

Two hundred quarts of skimmed milk are sterilized by heating in a vat and then cooled to 37° C. and inoculated with a young culture of *L. acidophilus*. The inoculated milk is allowed to incubate for 12½ hours at 37° C. At the end of the 12½ hours, the L. acidophilus culture in the milk produces an acidic condition approaching the formation of a curd. One quart of the disinfected, substantially vegetative-bacterial-cell-free ficin is mixed with 200 quarts of the 12½ hour-old L. acidophilus culture, making an approximately 0.05% ficin suspension in the culture. The mixed acidophilus milk culture and enzyme suspension is incubated at 37° C. for 7¾ hours. The total incubation period for the acidophilus milk culture at this time is 20¼ hours.

One quart of saturated $Na_2CO_3$ solution is mixed with the 20¼ hour-old culture to reduce its acidity, and 95 grams of purified, dry, powdered ficin are added. This produces a total concentration of about 0.1% ficin in the milk culture. After 2¼ hours more incubation, the digested culture is filtered through sterile flannel and the filtrate is run through an ordinary cream separator. The concentrated bacterial cells in the bowl of the separator are washed once in about 150 quarts of sterile tap water and reconcentrated by centrifugation. The final bacterial cell concentrate is suspended in about 9 quarts of sterile water. The pH is adjusted to about 6.1, and the suspension is placed in sterile quart bottles, each containing about five grams of $CaCO_3$.

The viable L. acidophilus cell count of a diluted concentrate prepared as indicated above is approximately 3,400,000,000 per milliliter. More efficient separation of the bacterial cells from the digested milk culture may be obtained if a Sharples Super-Centrifuge is used instead of an ordinary cream separator.

The enzyme used in the second digestion in this experiment is purified and concentrated experimentally by an industrial laboratory. It is added to the mixture in the form in which it is received; that is, without applying further disinfecting procedures. This omission of laboratory disinfection is feasible only when commercially purified enzyme preparations are free from objectionable contamination.

Enzymes used in the process described here should not be added to the milk cultures in the form of dry powders because it is difficult, in practice, to obtain satisfactory mixing of the dry powdered enzymes with the fluid culture. Slightly higher concentrations of enzyme and slightly longer digestion periods will yield better results.

EXAMPLE IV

Seventy-two gram lots of papain are suspended in each of two quarts of freshly boiled, sterile, tap water. Forty-five grams of pepsin are weighed and suspended in 500 milliliters of freshly boiled, sterile, tap water. These suspensions are held at 63 to 65° C. for 30 minutes to destroy objectionable vegetative bacterial cells. After the bacterial cell destruction, the enzyme suspensions are cooled to 6 to 9° C.

One hundred quarts of skimmed milk are sterilized by heating in a vat and then cooled to 37° C. and inoculated with a young culture of L. acidophilus. The inoculated milk is allowed to incubate for 10 hours at 37° C. The two quarts of disinfected, substantially vegetative-bacterial-cell-free papain are mixed with the 100 quarts of 10-hour-old L. acidophilus culture, making an approximately 0.15% papain suspension in the culture. The mixed acidophilus milk culture and enzyme suspension is incubated at 37° C. for 7½ hours, making the total incubation period for the acidophilus milk culture 17½ hours.

Fifty quarts of supernatant fluid are siphoned from the vat. To the remaining 50 quarts of acidophilus milk culture, 500 milliliters of disinfected, substantially vegetative-bacterial-cell-free pepsin are added, making an approximately 0.1% pepsin suspension in the culture, and making the total concentration of papain and pepsin approximately 0.25%. After 5 hours' additional incubation, the digested culture is filtered through sterile flannel, and the filtrate is run through a cream separator. The concentrated bacterial cells in the bowl of the separator are washed 3 times with sterile tap water. The cells are suspended in about 30 liters of sterile tap water and the pH is adjusted with equal amounts of 5% NaOH, 5% KOH, and 5% $K_2HPO_4$. More sterile water is added to the suspended cells, and they are reconcentrated by running through a cream separator. The concentrated cells in the bowl of the separator are again washed 3 times with sterile water. The final bacterial cell concentrate is suspended in 8 quarts of sterile tap water, and the pH is adjusted to about 6.2. The suspension is placed in sterile quart bottles, each of which contains about 5 grams of $CaCO_3$.

The viable L. acidophilus cell count of a fluid concentrate that is prepared according to the method described in Example IV is at least 1,300,000,000 per milliliter. Better results may be expected if the incubation temperature during the course of the experiment and the acidity are properly controlled, and if the curd is diluted and the lengths of the initial and total incubation periods are great enough to permit maximum culture development.

Examples I through IV are examples of pilot-plant-scale operation.

The following table sets forth additional examples of this invention. These examples are based on laboratory-scale experiments in which 200 milliliters of milk are used. The culturing and digestion procedures employed are similar to those described in Example I. Special conditions prevailing in the various examples are indicated by symbols keyed to a list of explanations presented after the table. Some of the examples show modifications of the invention that are unsatisfactory; others show modifications that are satisfactory. Modifications that yield suspensions of bacteria that contain large numbers of viable cells and low concentrations of undigested casein are satisfactory. In this table, no concentration techniques are indicated. The pilot-plant-scale concentration procedures described in Examples I through IV can be applied to any of the satisfactory digestion products.

Table 1

| Ex. | Age of culture* before digestion (hours) | Enzyme concentration pa-pain),ª percent | Digestion time (hours) | Percent of undigested curd ᵇ | Count/ml. before concentration | Total incubation period (hours) |
|---|---|---|---|---|---|---|
| V | 9 | 1 | { 11½ / 17¼ | 5 | 4.1M | 20½ / 26¼ |
| VI | 13½ | 0.3 | 6½ | 7.4 | 750M | 20 |
| VII | 17 | 0.2 | 6 | 20.5 | 910M | 23 |
| VIII | 2½ | 0.1 | 23½ | 18.15 | Contaminated | 26 |
| IX | 9 | 0.1 | 17 | 12 | 650M | 26 |
| X | 13½ | 0.1 | 6½ | 12.4 | 1.1B | 20 |
| XI | 17 | 0.1 | 5¼ | 29 | 950M | 22¼ |
| XII | 48 | 0.1 | { 6 / 24 | Not apparent / Slight | | |
| XIII | 10¼ | 0.06 | 14 | 13 | 870M | 24¼ |

*Key to symbols used in Table I*

*Lactobacillus acidophilus, Rettger strain.
ª Indicates heating at 70° C. for 30 minutes to render substantially vegetative-bacterial-cell-free.
ᵇ Indicates the percentage of undigested curd from the original medium as determined by centrifugation.
M represents million.
B represents billion.

Example V indicates that the addition of sufficient heat-treated papain suspension to a 9-hour-old culture of L. acidophilus to produce a 1% concentration is unsatisfactory. When this process is used there is a good digestion, but the large quantity of papain suspension inhibits the growth of the young *L. acidophilus* culture. Example IX shows that the addition to a 9-hour-old culture of 0.1% papain gives more satisfactory results. Although the casein digestion is not as good, the bacterial count obtained is more satisfactory.

Example VIII illustrates the results that follow when the culture to which papain is added is too young. The bacteria in the culture have not had time to produce concentrations of acid and antagonistic or antibiotic substances that are great enough to prevent the development of contaminating bacteria.

Examples VII, XI and XII show that curd digestion is not satisfactory when cultures of the ages indicated are treated with papain under the conditions listed.

Examples VI, X and XIII set forth conditions under which favorable single digestion results can be obtained. More satisfactory results follow the use of the methods described below.

Higher concentrations of micro-organism cells and lower percentages of curd are achieved by the use of the methods described in the following Examples XIV, and XVI through XVIII. In Example XIV, high speed agitation is applied to the digested milk culture. Any consequent foam that is produced, when rising, carries casein particles toward the surface. The remaining relatively casein-free, bacterial-cell-containing fluid can be separated from the foam with ease. A decrease of at least 50% in the amount of curd in the final digestion product over the digested but not agitated product is achieved.

EXAMPLE XIV

An 11-hour-old milk culture of *L. acidophilus* is digested for 6½ hours with 0.1% papain. The amount of undigested casein remaining in the culture is 14%, and the bacterial count is 740,000,000 per milliliter. The mixture is beaten with a high-speed agitator for 6 minutes. One hundred and eighty parts of original digest yield 38 parts of foam and 142 parts of relatively clear fluid. The fluid thus obtained contains 7% of undigested curd and 1,200,000,000 viable *L. acidophilus* cells per milliliter. The bacterial cells can be concentrated as indicated in Examples I through IV.

Examples I, and V through XIV set forth procedures involving a single digestion stage. It has been found that double digestion processes similar to those described in Examples II through IV, and the following Examples XV through XVIII, yield digested cultures that contain smaller amounts of undigested casein. When correctly applied, double digestion processes of these examples also provide bacterial suspensions from which higher concentrations of bacterial cells can be obtained.

EXAMPLE XV

A 9-hour-old milk culture of *L. acidophilus* is digested at 37° C. for 7¾ hours with 1% papain. The curd volume is reduced to 7% by this treatment. After separating the curd from the digested acidophilus milk, the curd is mixed with an equal volume of water, the pH is raised to 6.5 and sufficient papain suspension is added to produce an 0.5% concentration of the freshly added enzyme. To destroy objectionable vegetative bacterial cells, the enzyme suspensions used are heated at 70° C. for 30 minutes before use. The curd and enzyme mixture is held at 37° C. for an additional 6¾ hours to provide a total digestion period of 14½ hours. After the second digestion, the amount of curd remaining is 3.1% in terms of the original volume of milk culture. The bacterial count in the digested but not concentrated product is 2,000,000 per milliliter in terms of the original volume of milk culture.

The amount of digestion obtained is satisfactory. The bacterial count is low. In this modification of the process, too great a percentage of papain suspension is added to the culture before the bacteria are well established in the milk medium.

EXAMPLE XVI

Heat-treated papain suspension is added to make an 0.1% papain concentration in a 12½-hour-old *L. acidophilus* culture. The enzyme and culture mixture is digested for 10 hours at 37° C. After separating the undigested curd from the digested milk culture by sedimentation followed by decanting, 2 parts of the curd are mixed with 1 part of sterile water, and the pH is raised to 6.3. Sufficient heat-treated papain suspension is added to produce a 1% concentration of the freshly added papain. At the end of 1½ hours of digestion, the remaining curd, determined by centrifugation, is 5.1%, and the bacterial count is 735,000,000 per milliliter. After digesting for an additional 5 hours, the remaining curd is reduced to 3.8% in terms of the original milk medium, and the bacterial count in the digested but not concentrated product is 600,000,000 per milliliter in terms of the original volume of milk culture.

For the second digestion process, it is possible to use higher concentrations of papain than can be used for the first digestion process.

EXAMPLE XVII

Sufficient concentrated, heat-treated papain suspension is added to a 9-hour-old *L. acidophilus* culture to form an 0.1% papain concentration in the milk culture. After the papain has digested the casein in the culture for 7¾ hours at 37° C., the curd volume, as determined by centrifugation, is 14% in terms of the original volume of medium. The curd is separated from the digested material and mixed with an equal volume of sterile water. The pH of the diluted curd is raised to 6.5. Sufficient heat-treated papain suspension is added to yield an approximately 0.5% suspension of the freshly added enzyme. A further digestion of 14½ hours reduces the curd volume to 5.2% and provides a digested but not concentrated suspension that contains 1,300,000,000 viable cells per milliliter in terms of the original medium. The total incubation period is 31¼ hours.

Somewhat less satisfactory digestion is obtained when the second digestion process is carried out with a significantly lower percentage of papain than is used in Example XVI. The bacterial count obtained under these conditions is satisfactory.

EXAMPLE XVIII

Papain, prepared as indicated above, is added to an 11-hour-old *L. acidophilus* culture to form an approximately 0.1% suspension. The enzyme and culture mixture is held for 13 hours at 37° C. At the end of this period the remaining curd, as determined by centrifugation, is 9.9%, and the acidophilus count is 600,000,000 per milliliter in terms of the original medium. One part of curd is mixed with 2 parts of water, and the pH is raised to 6.5. An approximately 0.1% papain suspension is produced in the diluted curd. After an additional 7½ hours of digestion at 37° C., the amount of curd is reduced to 7.5%, and the bacterial count at the end of 31½ hours of incubation is 1,100,000,000 per milliliter in terms of the original medium.

When the second digestion process is carried out with a significantly lower percentage of papain than is used in Example XVIII, more undigested curd remains to interfere with the concentration process.

EXAMPLE XIX

Heat-treated papain suspension is added to a 12½-hour-old *L. acidophilus* culture to make an approximately 0.1% papain concentration in the culture. The enzyme and culture mixture is held for 5½ hours at 37° C., and the pH is then adjusted to 5.5. After an additional hour of digestion, sufficient heat-treated papain suspension is added to the total volume of the partially digested culture to produce an approximately 0.1% concentration of the freshly added papain. No separation of the curd from the fluid portion of the mixture is carried out in this procedure; there is no dilution with sterile water; the pH at this point is not further adjusted. At the end of an additional 2½ hours of digestion, the remaining curd, determined by centrifugation, is 16%, and the bacterial count is 570,000,000 per milliliter.

It is to be noted that the procedure used in this example does not separate the curd from the fluid and provides less satisfactory digestion than is obtained when the procedure described in Example XVIII is used.

The preceding examples, with two exceptions, set forth embodiments of this invention employing only papain as the digesting enzyme. As indicated by the introductory explanation of the invention, this invention is not limited to the use of any specific enzyme or group of enzymes, but may be carried out with any substantially vegetative-bacterial-cell-free proteolytic enzyme which digests at an acid pH. The following Examples XX through XXVII illustrate the embodiment of this invention employing proteolytic enzymes that act in an acid environment. They also illustrate the inoperability of enzymes which do not effectively digest in the acid range. These examples are based on laboratory-scale experiments in which 200 milliliters of milk are used. The culturing and digestion procedures employed are similar to those described in Example I. Special conditions prevailing in the various examples are indicated by symbols keyed to a list of explanations presented after the table. In this table, no concentration techniques are indicated.

*Table II*

| Ex. | Age of culture* before digestion (hours) | Enzyme concentration (ficin), percent | Digestion time (hours) | Percent of undigested curd b | Count/ml. before concentration | Total incubation period (hours) |
|---|---|---|---|---|---|---|
| XX | 14 | ᵃ ᶜ 0.08 | 8 | 23 | 1B | 22 |
| XXI | 14 | ᵃ ᵈ 0.06 | 8 | 40 | 950M | 22 |
| XXII | 10 | ᵉ ᶜ 0.05 | 14½ | 14 | 530M | 24½ |
| XXIII | 12 | ᶜ ᶜ 0.05 | { ᶠ 7 / 9 } | 18 / 16 | 640M | 21 |

*Key to symbols used in Table II*

Reference is made to Key to Symbols in Table I, with the following additions:
 ᶜ Indicates commercial ficin.
 ᵈ Indicates batch of ficin purified experimentally in an industrial laboratory.
 ᵉ Indicates heating at 65° C. for 30 minutes to render essentially vegetative-bacterial-cell-free.
 ᶠ Indicates adjustment of pH to 5.5 after 7 hours of digestion.

It should be noted in Examples XX and XXI, that ficin, under the conditions indicated, does not adversely affect the viability of *L. acidophilus* cells. Poor digestion results follow the application of small amounts of ficin to cultures in which curd has begun to form. In Examples XXII and XXIII smaller amounts of ficin are added to *L. acidophilus* cultures just prior to curding. Better casein digestion follows this procedure. A comparison of Examples XX and XXI indicates that partially purified ficin is more sensitive to destruction by heat than is the crude, commercial product.

The examples of the following Table III set forth embodiments of this invention in which additional enzymes are used. Pepsin digests protein most effectively in an acid environment; pancreatin is most active in an alkaline environment. The examples represent operations on a laboratory-scale.

*Table III*

| Ex. | Age of culture* before digestion (hours) | Enzyme concentration ᵍ | Digestion time (hours) | Percent of undigested curd b | Count/ml. before concentration | Total incubation period (hours) |
|---|---|---|---|---|---|---|
| XXIV | 11 | 0.1% pepsin | 7½ | 14 | 510M | 18½ |
| XXV | 23½ | ----do---- | 6½ | 25 | 710M | 39 |
| XXVI | 8 | 0.1% pancreatin | 26¼ | 30 | 250M | 34¼ |
| XXVII | 12 | ----do---- | 26¼ | 36 | 360M | 38¼ |

*Key to symbols used in Table III*

Reference is made to Key to Symbols in Table I, with the following addition:
 ᵍ Indicates heating at 63 to 65° C. for 30 minutes to render essentially vegetative-bacterial-cell-free.

A comparison of Examples XXIV and XXV shows that good casein digestion can be obtained when a pepsin suspension that has been held at from 63 to 65° C. for 30 minutes is added to a young *L. acidophilus* culture, and that unsatisfactory digestion follows the addition, as the primary digesting agent, of the same proportion of pepsin to an older culture. Contrary to possible expectations, (1) pepsin, like papain and ficin, when used as the primary digesting agent, produces better digestion when added to young *L. acidophilus* cultures, and (2) concentrated suspensions of crude, commercial pepsin retain sufficient enzyme activity after heat treatment to produce satisfactory digestion results.

Examples XXVI and XXVII illustrate the poor results that are obtained when pancreatin is used as the digesting agent.

As indicated above, this invention is not limited to the growth and concentration of *Lactobacillus acidophilus*. Among the other bacterial species which grow most readily in milk media and produce a coagulation of the casein are *Lactobacillus bulgaricus* and *Streptococcus lactis*.

The examples set forth in Table IV illustrate the reproduction of cells of these bacterial species under the conditions of this invention.

*Table IV*

| Ex. | Age of culture before digestion (hours) | Enzyme concentration (papain), percent | Digestion time (hours) | Percent of undigested curd b | Count/ml. before concentration | Total incubation period (hours) |
|---|---|---|---|---|---|---|
| XXVIII ʰ | ⁱ 6 | ᵉ 0.1 | 4½ | 14 | 425M | 10½ |
| XXIX ʰ | 7 | ᵉ 0.1 | 4 | 30 | 540M | 11 |
| XXX ʲ | ᵏ 10 | ᵉ 0.1 | 8½ | 20 | 310M | 18½ |
| XXXI ʲ | ᵏ 13¼ | ᵉ 0.1 | 8½ | 15 | 240M | 21¾ |
| XXXII ʲ | ᵏ 14½ | ᵉ 0.1 | 8½ | 13 | 160M | 23 |

*Key to Symbols used in Table IV*

Reference is made to Key to Symbols in Tables I, II and III, with the following additions:
 ʰ Indicates that the culture used is *Lactobacillus bulgaricus*.
 ⁱ Indicates use of a 1% inoculum. In all the other examples presented in this application, the amount of culture added to the sterile medium as inoculum is 2% by volume.
 ʲ Indicates that the culture used is *Streptococcus lactis*.
 ᵏ Indicates that incubation and digestion are carried out at 23 to 24° C.

Examples XXVIII and XXIX show that *L. bulgaricus* cultures, like *L. acidophilus* cultures, are less readily digested by papain after their ages have exceeded a certain number of hours. It should be noted that the optimal age for enzyme addition is lower and the necessary total incubation period is shorter when the *L. bulgaricus* strain used in these examples is substituted for the Rettger strain of *L. acidophilus*. This *L. bulgaricus* strain grows more rapidly and produces acid curd more rapidly than does the Rettger strain of *L. acidophilus*.

It will be noted in Examples XXX through XXXII that, as the length of the incubation period prior to enzyme treatment is extended, the degree of casein digestion improves. The longer incubation period that must precede the addition of papain to cultures of the

*Streptococcus lactis* strain used here in order to assure satisfactory casein digestion is necessary because this strain grows and produces acid and other metabolic products slowly. As a result, the optimal conditions for casein digestion with papain are reached later with this culture than with more rapidly growing *L. acidophilus* and *L. bulgaricus* strains.

This illustrates the aspect of this invention which employs the principle that up to the point of coagulation, increasing acidity renders casein more readily digestible by enzyme action. It should be noted that even better digestion of the casein in the milk culture may be obtained with *S. lactis* if the enzyme is added immediately prior to casein coagulation. It also should be noted that the bacterial cell count for *S. lactis* represents the count of chains of cells rather than individual cells or pairs of cells, as is the case with lactobacilli.

Digestion, as employed herein, refers to the transformation of proteins under influence of enzymes, formerly called ferments, into assimilable substances. Specifically, digestion refers to the type of action which takes place in the changing of proteins to peptones by pepsin. It is a feature of this invention that the digestion of casein by the introduced enzyme or enzymes, combined with the obtainment of a high bacterial count, permits the realization of the concentrate, which is the ultimate product of this invention. It should be noted that in some of the examples cited herein, the extent of protein digestion is more indicative of the success of the process described than is the achievement of a high bacterial count. This is true because, in certain of the examples cited, conditions unrelated to the features of the invention which, nevertheless, affect the bacterial count are not properly controlled.

The efficiency of each digestion process, used in the above examples, may be evaluated by comparing the amount of undigested curd in the digested cultures with the amount of curd that occurs in control *L. acidophilus* cultures. *L. acidophilus* control cultures are not subjected to digestion and have been found to contain curd in amounts of about 40% by volume.

It will be understood that the embodiments of this invention in the above-noted description are merely illustrative and that various modifications may be made within the spirit of this invention. As indicated, this invention is applicable to micro-organisms which grow most readily in milk media and produce coagulation of the casein. The invention is applicable to the use of various enzymes that act effectively in an acid environment and that can be employed to digest coagulable or coagulated protein in such cultures. Moreover, the enzymes which may be employed in the process and product of this invention are merely limited to be proteolytic, substantially vegetative-bacterial-cell-free, and active in an acid environment. The means of incubating the cultures in milk media may be varied in any way which leads to the production of the desired high bacterial count. The ultimate concentration of bacteria in the finished product is dependent upon such factors as the extent of the digestion of the casein, the number of organisms in the digested milk culture, and the efficiency of the concentration procedures. Accordingly, it is intended that this invention cover the process of incubating micro-organism cultures to provide growth in milk media and introducing appropriate proteolytic enzyme solutions or suspensions into said growing cultures when there prevails in the cultures the most satisfactory balance of conditions that favor both the continued growth of the desired bacteria and the digestion of the casein in the milk. The invention also relates to the product of this process and to concentrates which may be produced from this product.

The micro-organism concentrations of this invention are useful wherever the utilization of higher than normal quantities of cells is desired. One such application is found in the employment of concentrates of *L. acidophilus* for the implantation of *L. acidophilus* in the intestinal tract.

*Lactobacillus acidophilus* implantation in the intestinal tract refers to the replacment of large numbers of commonly occurring intestinal bacteria in the intestinal canal by viable *L. acidophilus* cells. Suitable methods of implantation are described in the following reference publications:

*Bacillus acidophilus*, N. Kopeloff, 1925, The Williams and Wilkins Company, Baltimore, Maryland.

*Lactobacillus acidophilus* (an annotated bibliography to 1931), W. D. Frost and H. Hankinson, 1931, Davis-Greene Corporation, Milton, Wisconsin.

Zinsser's Textbook of Bacteriology, David T. Smith et al., tenth edition, 1952, pp. 576–577, Appleton-Century-Crofts, Inc., New York, N. Y.

Effect on Weight Gain of the Addition of *Lactobacillus acidophilus* to the Formula of Newborn Infants, E. L. Robinson and W. L. Thompson, J. of Pediatrics, 41, 1952, pp. 395–398.

The *L. acidophilus* concentrates described in this application were prepared with an authentic *L. acidophilus* strain obtained from the late Professor Leo F. Rettger and described in the monograph entitled "*Lactobacillus acidophilus* and Its Therapeutic Application" by Rettger, Levy, Weinstein, and Weiss, published in 1935 by the Yale University Press, New Haven, Connecticut.

Concentrates prepared by the method of Examples I through III, were used in in vivo tests to determine their implantation properties. The degrees of implantation that were obtained when the concentrates were taken orally were compared with those obtained when high quality acidophilus milk was ingested.

In the control implantation tests in which acidophilus milk was used, four human experimental subjects consumed from a pint to a quart of high quality acidophilus milk daily for an average period of seven months. During this period the *L. acidophilus* counts in the milk ranged from 124,000,000 to 680,000,000 per milliliter. They were usually well over 500,000,000 per milliliter. The extent to which viable *L. acidophilus* cells replaced other bacteria in the intestinal flora was determined with 50 fecal specimens submitted by the four human experimental subjects. Of these 50 specimens, 8% showed *L. acidophilus* implantations that were above 20%. Satisfactory methods of determining implantation results are described in the following publication: *Lactobacillus acidophilus* and Its Therapeutic Application, Rettger, Levy, Weinstein, and Weiss, 1935, at pp. 193–195.

In implantation tests in which concentrates prepared by the method of this invention were used, two human experimental subjects consumed from less than a half-pint to less than a pint of acidophilus concentrate per day for an average period of 31½ days. The initial *L. acidophilus* counts in the concentrates consumed ranged from 2,400,000,000 to 3,500,000,000 per milliliter. The counts were, however, lower in some of the concentrates at the time of ingestion. The extent to which viable *L. acidophilus* cells replaced other bacteria in the intestinal flora was determined with 13 fecal specimens submitted by the two human experimental subjects. Of these 13 specimens, 85% showed *L. acidophilus* implantations that were above 20%.

The following tables graphically illustrate the comparative results obtained in implantation tests. The extent to which viable *L. acidophilus* cells replaced other bacteria in the intestinal flora when acidophilus milk was ingested is indicated by the figures set forth in Table V. Similar determinations, made after the ingestion of *L. acidophilus* concentrates prepared according to the procedures described in Examples I through III, are set forth in Table VI.

Table V

[Summary of implantation results obtained when a pint to a quart of acidophilus milk was consumed daily (milk counts ranged from 124 million to 680 million per ml.).]

| Human subject | Duration of feeding acidophilus milk | Number of fecal specimens tested | Number of fecal specimens that showed the indicated percent L. acidophilus implantation | | | | | | | | | | | | | | | | | | | | Percent of specimens with implantations above 20% |
|---|---|---|---|---|---|---|---|---|---|---|---|---|---|---|---|---|---|---|---|---|---|---|---|
| | | | Percent L. acidophilus implantation | | | | | | | | | | | | | | | | | | | | |
| | | | 0 | 1-5 | 6-10 | 11-15 | 16-20 | 21-25 | 26-30 | 31-35 | 36-40 | 41-45 | 46-50 | 51-55 | 56-60 | 61-65 | 66-70 | 71-75 | 76-80 | 81-85 | 86-90 | 91-95 | |
| A | 12 months | 20 | 5 | 7 | 2 | 1 | 3 | | | | | 1 | | | | | | | 1 | | | | 10 |
| B | 6 months | 19 | 10 | 5 | 2 | | | | | 1 | | | | | | | | | 1 | | | | 10½ |
| C | 10 months | 8 | 7 | 1 | | | | | | | | | | | | | | | | | | | 0 |
| D | 14 days | 3 | | 3 | | | | | | | | | | | | | | | | | | | 0 |
| Summary for experiment | 7 months (average) | 50 | 22 | 16 | 4 | 1 | 3 | | | 1 | | 1 | | | | | | | 2 | | | | 8 |

8% of the 50 specimens tested showed L. acidophilus implantations that were above 20%.

Table VI

[Summary of implantation results obtained when less than a half-pint to less than a pint of acidophilus concentrate was consumed daily (concentrate counts ranged from 2.4 billion to 3.5 billion per ml.).]

| Human subject | Duration of feeding acidophilus concentrate | Number of fecal specimens tested | Number of fecal specimens that showed the indicated percent L. acidophilus implantation | | | | | | | | | | | | | | | | | | | | Percent of specimens with implantations above 20% |
|---|---|---|---|---|---|---|---|---|---|---|---|---|---|---|---|---|---|---|---|---|---|---|---|
| | | | Percent L. acidophilus implantation | | | | | | | | | | | | | | | | | | | | |
| | | | 0 | 1-5 | 6-10 | 11-15 | 16-20 | 21-25 | 26-30 | 31-35 | 36-40 | 41-45 | 46-50 | 51-55 | 56-60 | 61-65 | 66-70 | 71-75 | 76-80 | 81-85 | 86-90 | 91-95 | |
| E | 59 days | 11 | | *1 | | 1 | | 1 | 2 | | | 2 | 2 | | 1 | | | | 1 | | | | 82 |
| A | 4 days | 2 | | | | | | | | | | | | 1 | | | | | | | | 1 | 100 |
| Summary for experiment | 31½ days (average) | 13 | | *1 | | 1 | | 1 | 2 | | | 2 | 2 | 1 | 1 | | | | 1 | | 1 | | 85 |

*Out-dated concentrate.
85% of the 13 specimens tested showed L. acidophilus implantations that were above 20%.

It is to be noted that subject A was tested with both acidophilus milk and L. acidophilus concentrates prepared by my method. The bacterial counts of the ingested acidophilus milk of Table V ranged from 124,000,000 to 680,000,000 per milliliter, but were usually well over 500,000,000 per milliliter. The initial bacterial counts of the concentrates of Table VI ranged from 2,400,000,000 to 3,500,000,000 per milliliter.

The advantages of concentrating microorganisms by this invention and producing the resultant concentrated product are applicable wherever concentrates of the micro-organisms are desired. A particularly cogent advantage may be seen in the concentration of L. acidophilus for the implantation described above. It is well known that L. acidophilus milk is a liquid which is distasteful to a large number of people and is completely inedible for many people. The concentration of L. acidophilus cells, provided by this invention, produces a product which is completely lacking in the customary acidophilus taste. In addition, the concentrate may be incorporated in any edible fluid which is not bactericidal. Accordingly, masking flavors may be employed to remove even the small and not unpleasant salty taste that is characteristic of the concentrate. The tremendous advantage of such a product and its wide application of use is readily apparent.

Another advantage of this invention is the easy method of beat-separation of curd and fluid, described above. Further advantages include the ease and variety of methods of separating the remaining curd from the digested culture. Also, the digestion method of this invention can be used in producing a concentrate from which bacterial-cell-containing pastes, powders and tablets can be prepared. The concentrate obtained by the method of this invention and product itself are adequate for the manufacture of such bacterial-cell-containing pastes, powders, and tablets.

As mentioned above, the described embodiments set forth herein are for the purpose of illustration of this invention and it is intended that the invention be limited only by the scope of the appended claims.

What is claimed is:

1. The process for obtaining, in media from which they can be readily recovered and concentrated, large populations of micro-organisms belonging to species of the family Lactobacteriaceae which produce acid coagulation upon growth in milk and which are not strictly anaerobic in that they include strains which are microaerophilic and strains which are metabolically indifferent with respect to oxygen and are often called facultative anaerobes, comprising the steps of inoculating media, composed principally of milk, with cultures of at least one of the aforesaid species; growing the inocula in said media to produce well-established cultures of the bacteria therein and to produce sufficient acidity as a result of such growth to reduce the pH to the range of about 6.5 to about 4.5; separately preparing in an aqueous medium a proteolytic enzyme of the type which is able to digest casein in an acid environment, treating said enzyme to render it substantially free from vegetative bacterial cells; adding the enzyme so prepared to said well-established cultures in an effective amount which is equivalent to from about 0.05% up to about 1% of commercial grade of white Ceylon papain, which has been heated while in an aqueous medium to a temperature in the range of about 63°–70° C. for about ½ hour; and continuing the growth of the bacteria in the treated media, while digesting the casein content thereof with the enzyme to minimize the quantity of curd present; the development of contaminating bacteria in the mixtures being substantially prevented by the accumulated metabolic products of the multiplying bacteria being grown as aforesaid.

2. The process in accordance with claim 1, in which the micro-organisms to be grown in the media comprise at least one species selected from the group which consists of *Lactobacillus acidophilus*, *Lactobacillus bulgaricus*, and *Streptococcus lactis*.

3. The process in accordance with claim 1, in which the micro-organism to be grown is *Lactobacillus acidophilus*.

4. The process in accordance with claim 1, in which the pH is reduced to the range of about 6 to about 4.5 prior to the introduction into the media of the enzyme as aforesaid.

5. The process in accordance with claim 1, in which the initial growth of the micro-organisms is carried on to a degree such that the pH of the medium is lowered to about that at which curd formation is brought about by progressively increasing acid concentration due to the acidity produced in the medium as a result of the growth of the micro-organisms.

6. The process in accordance with claim 1, in which the proteolytic enzymes used comprise at least one enzyme selected from the group which consists of papain, ficin, and pepsin.

7. The process in accordance with claim 1, in which the proteolytic enzyme used is papain.

8. The process in accordance with claim 1 in which the proteolytic enzyme used is ficin.

9. The process for obtaining, in media from which they can be readily recovered and concentrated, large populations of micro-organisms belonging to species of the family Lactobacteriaceae which produce acid coagulation upon growth in milk and which are not strictly anaerobic in that they include strains which are micro-aerophilic and strains which are metabolically indifferent with respect to oxygen and are often called facultative anaerobes, comprising the steps of inoculating media, composed principally of milk, with cultures of at least one of said species; growing the inocula in said media to produce well-established cultures of the bacteria therein and to produce sufficient acidity as a result of such growth to reduce the pH to the range of about 6.5 to about 4.5; separately preparing in an aqueous medium a proteolytic enzyme of the type which is able to digest casein in an acid environment, treating said enzyme to render it substantially free from vegetative bacterial cells; adding the enzyme so prepared to said well-established cultures in an effective amount which is equivalent to from about 0.05% up to about 1% of commercial grade of white Ceylon papain, which has been heated while in an aqueous medium to a temperature in the range of about 63°–70° C. for about ½ hour; continuing the growth of the bacteria in the treated media, while digesting the casein content thereof with the enzymes to minimize the quantity of curd present; separating a major part of the curd remaining after a substantial period of growth and digestion as aforesaid from the relatively clear liquid to produce a curd fraction and a clear liquid fraction; diluting said curd fraction and at least partially neutralizing the acid therein, adding to the curd fraction as so treated a further quantity of a proteolytic enzyme, which is prepared and treated as aforesaid so as substantially to free it from vegetative bacterial cells, so as to produce in the mixed medium an enzyme concentration which is equivalent to about 0.35% to about 1.5%, both calculated as aforesaid; and further growing the desired micro-organisms in this medium while further digesting the remaining curd therein; the development of contaminating bacteria in the medium being substantially prevented by the accumulated metabolic products of the multiplying bacteria, and the desired micro-organisms being recoverable both from the clear liquid fraction separated as aforesaid and from the curd fraction which is further processed as aforesaid.

10. The process in accordance with claim 9, in which a substantially higher concentration of enzyme is used in the second digestion of the curd fraction than in the first named digestion of the curd which follows the initial introduction of an enzyme.

11. The process in accordance with claim 9, in which the first digestion, effected by adding the first named enzyme, is carried on by adding an enzyme selected from the group consisting of papain and ficin; while the second digestion, effective upon the curd fraction, is carried on by adding to this fraction an amount of pepsin calculated to bring the total enzyme concentration up to a predetermined desired amount within the range stated.

References Cited in the file of this patent

UNITED STATES PATENTS

| | | |
|---|---|---|
| 1,540,951 | Reichel | June 9, 1925 |
| 1,957,555 | Reichel | May 8, 1934 |

OTHER REFERENCES

Prescott et al.: Industrial Microbiology, 1949, McGraw-Hill Book Co. Inc., New York, page 406.